United States Patent
Lunden et al.

(10) Patent No.: US 9,749,912 B2
(45) Date of Patent: Aug. 29, 2017

(54) MEASUREMENT CONFIGURATION FOR HETEROGENOUS NETWORKS

(71) Applicant: Nokia Technologies Oy, Espoo (FI)

(72) Inventors: Petteri Lunden, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/780,164

(22) PCT Filed: Apr. 4, 2013

(86) PCT No.: PCT/US2013/035335
§ 371 (c)(1),
(2) Date: Sep. 25, 2015

(87) PCT Pub. No.: WO2014/163644
PCT Pub. Date: Oct. 9, 2014

(65) Prior Publication Data
US 2016/0044569 A1    Feb. 11, 2016

(51) Int. Cl.
*H04W 36/00*  (2009.01)
*H04W 84/04*  (2009.01)

(52) U.S. Cl.
CPC .... *H04W 36/0055* (2013.01); *H04W 36/0094* (2013.01); *H04W 84/045* (2013.01)

(58) Field of Classification Search
CPC .................................................. H04W 36/0055
USPC ....................................................... 370/331
See application file for complete search history.

(56) References Cited

U.S. PATENT DOCUMENTS

2009/0247150 A1    10/2009    Fischer et al.

FOREIGN PATENT DOCUMENTS

| FI | WO2011138494 | * 11/2011 | ............ H04W 36/24 |
|---|---|---|---|
| WO | 2011041753 | 4/2011 | |
| WO | 2011123744 | 10/2011 | |
| WO | 2011138494 | 11/2011 | |

OTHER PUBLICATIONS

International Search Report and Written Opinion received for corresponding Patent Cooperation Treaty Application No. PCT/US2013/035335, dated Dec. 5, 2013, 10 pages.

(Continued)

*Primary Examiner* — Ronald B Abelson
(74) *Attorney, Agent, or Firm* — Mintz Levin Cohn Ferris Glovsky and Popeo, P.C.

(57) ABSTRACT

Methods and apparatus, including computer program products, are provided for measurement configuration in heterogeneous networks. In one aspect there is provided a method. The method may include receiving, at a user equipment, configuration information including a range of mobility state values, wherein the range of mobility state values are associated with one or more event reporting criteria; determining, at the user equipment, whether at least one of the range of mobility state values is valid based on a determined mobile state estimation of the user equipment; and determining, based on the determined validity of the range of mobility state values, whether to enable reporting associated with the one or more event reporting criteria. Related apparatus, systems, methods, and articles are also described.

18 Claims, 4 Drawing Sheets

(56) References Cited

OTHER PUBLICATIONS

Alcatel-Lucent et al. "On UE-speed-based methods for improving the mobility performance in HetNets", 3GPP Draft; R-2120652—Speed Based Methods for Improving Mobility Performance in Hetnet, 3rd Generation Partnership Project (3GPP), Mobile Competence Centre; 650 Route Des Lucioles; F-06921 Sophia-Antipolis Cedex; France; vol. RAN WG2, No. Dresden Germany; Feb. 6, 2012-Feb. 10, 2012, Jan. 31, 2012.

Nokia Corporation et al. "MSE Based Inter-frequency Measurements", 3GPP Draft; R-2131878, 3rd Generation Partnership Project (3GPP), Mmobile Competence Centre; 650 Route Des Lucioles;F-06921 Sophia-Antipolis Cedex, France, volmRAN WG2, No. Fukuoka Japan May 20, 2013-May 24, 2013, May 10, 2013.

3GPP, "Technical Specification Group Radio Access Network; Enhanced performance requirement for LTE User Equipment (UE) (Release 11)," 3rd Generation Partnership Project, 3GPP TR 36.829 V11.1.0, Jan. 2013.

3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.2.0, Feb. 2013.

3GPP, "Technical Specification Group Radio Access Network; Evolved Universal Terrestrial Radio Access (E-UTRA); Physical Channels and Modulation (Release 11)," 3rd Generation Partnership Project, 3GPP TS 36.211 V11.20.0, Feb. 2013.

3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.2.0, Feb. 2013.

3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.2.0, Dec. 2012.

3GPP, "Technical Specification Group Radio Access Network; Evolved Universal Terrestrial Radio Access (E-UTRA); Radio Resource Control (RRC); Protocol specification (Release 11)," 3GPP TS 36.331 V11.3.0, Mar. 2013.

* cited by examiner

MEASUREMENT CONFIGURATION FOR HETEROGENOUS NETWORKS

RELATED APPLICATION

This application was originally filed as PCT Application No. PCT/US2013/035335 filed Apr. 4, 2013.

FIELD

The subject matter described herein relates to wireless communications.

BACKGROUND

The use of heterogeneous networks (HetNets) may provide opportunities for offloading traffic from macrocells to a typically higher capacity small cell. The heterogeneous network may include one or more wireless access points, or base stations, such as for example an E-UTRAN (evolved Universal Mobile Telecommunications System Terrestrial Radio Access Network) NodeB base station serving macrocells and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have functionality similar to a typical base station, such as for example an E-UTRAN NodeB (eNB) base station, but the small cell base station may have less range and output power given its limited coverage area. For example, the small cell base station may be implemented as a wireless access point/femtocell base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided for measurement configuration in heterogeneous networks. In one aspect there is provided a method. The method may include receiving, at a user equipment, configuration information including a range of mobility state values, wherein the range of mobility state values are associated with one or more event reporting criteria; determining, at the user equipment, whether at least one of the range of mobility state values is valid based on a determined mobile state estimation of the user equipment; and determining, based on the determined validity of the range of mobility state values, whether to enable reporting associated with the one or more event reporting criteria.

In some variations, one or more of the following features can optionally be included in any feasible combination. The range of mobility state values may include at least one mobility state estimation value. The range of mobility state values may be mapped to the one or more event reporting criteria. The configuration information may include the range of mobility state values mapped to the one or more event reporting criteria to inhibit reporting when the determined mobility state of the user equipment indicates a high degree of mobility and a small cell is involved with a potential handover. The configuration information may be at least one of signaled by the network or received as a default configuration in accordance with a standard. When the reporting is inhibited, the user equipment may not perform one or more measurements associated with the inhibited report. The one or more event reporting criteria may include at least one of an event, an Event A1, an Event A2, an Event A3, an Event A4, an Event A5, and an Event A6. The range of mobility state values may include a plurality of states, each of which is mapped to the one or more event reporting criteria. The range of mobility state values may include at least one mobility state estimation value representative of a mobility of the user equipment. The range of mobility state values may include at least one of a normal condition, a medium condition, or a high condition. The determined mobility state may be determined by at least estimating a mobility state for the user equipment. The one or more event reporting criteria may be monitored, when enabled for reporting.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
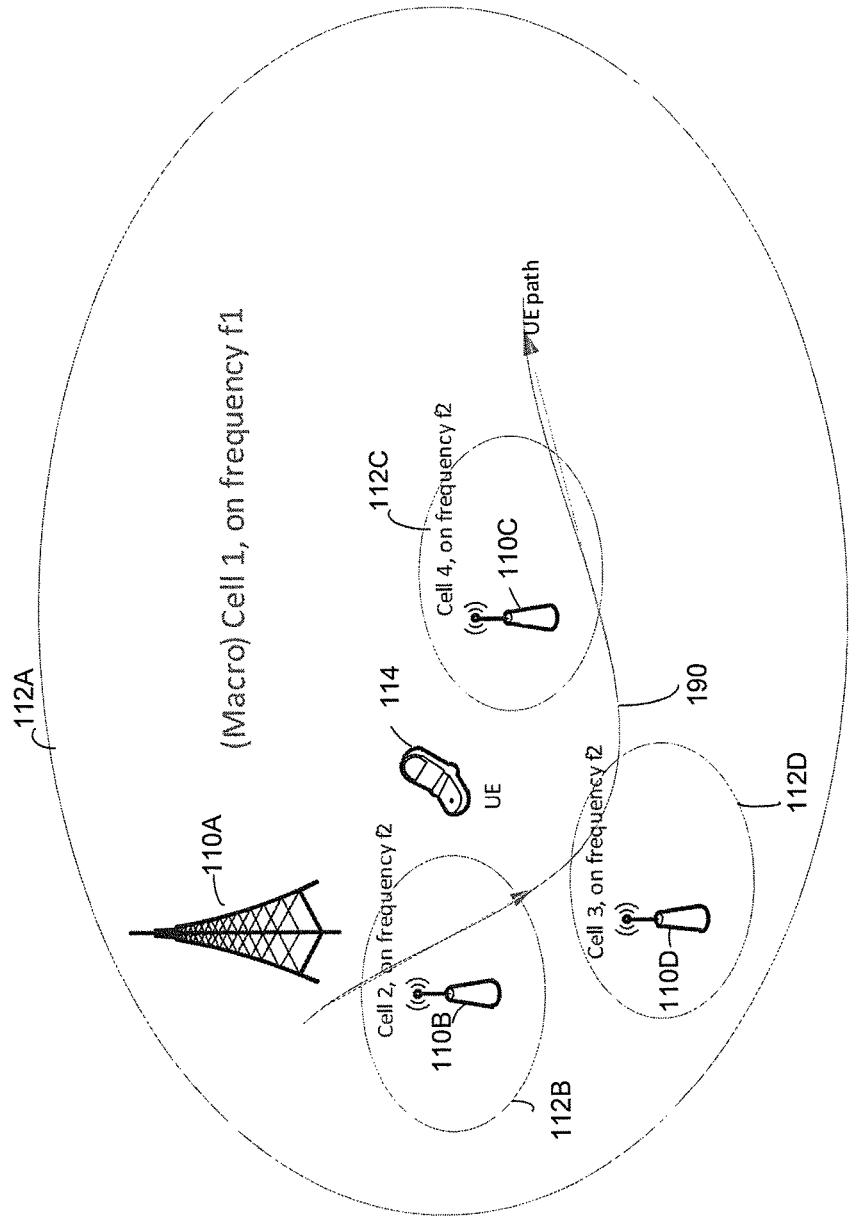
FIG. 1 depicts an example of a system configured to allow configuration of event reporting, in accordance with some exemplary embodiments.

Like labels are used to refer to same or similar items in the drawings.

DETAILED DESCRIPTION

Handovers in heterogeneous networks including macrocells and small cells can be problematic. For example, a fast moving user equipment may be handed over to a small cell, but although the inbound handover to the small cell succeeds, the fast moving user equipment may exit the coverage area of the small cell before the user equipment can make a controlled handover back to the macrocell. Thus, the handover to the small cell represents wasted network resources in terms of power, signaling, capacity, and the like. For this and other reasons, it may be preferable to control the user equipment by for example keeping a fast moving user equipment from handing over to a small cell. This can be done by, for example, controlling the types of measurements triggered and thus reported by the user equipment to the network because without user equipment reporting the network will likely not propose a handover to a small cell.

In some example embodiments, the subject matter disclosed herein relates to controlling, based on user equipment mobility, the reporting performed by the user equipment.

In some example embodiments, there may be provided network controlled mechanism to flexibly limit the user equipment's measurements to a configured range of valid mobility state estimations (MSEs). In some example embodiments, this may be achieved by introducing an indication of the MSE validity range to a reporting configuration or by introducing an indication of the MSE validity range that is associated with a measurement object. For example, the network may configure the user equipment to apply a certain measurement object (for example, a small cell carrier) only when the user equipment is in a normal MSE or similarly configure the reporting configuration for a small cell carrier that is valid only when the user equipment is in normal MSE. For example, the network including nodes, such as a base station, may control the user equipment's reporting including event-based reporting and the like. The network may control reporting by, for example, configuring the user equipment's reporting based on a determined mobility or speed, such as a mobility state estimation (MSE). For example, the user equipment may determine its degree of mobility or speed using MSE (wherein MSE may be determined based on a quantity of handovers or cell reselections or other mobility related events in a given time window and the like) and determine, based on the MSE configuration information, a valid reporting event criteria. The MSE configuration information may indicate for one or more MSE conditions, such as a normal mobility, a high mobility, and so forth, whether one or more reporting events should be made active. These reporting events, such as Event A1, Event A3, Event A5, and the like, represent different criteria that can be established at the user equipment to trigger reporting measurements to the network. For example, Event A5 (which is described in, for example, 3GPP TS 36.331) is configured to trigger the user equipment to send a report to the network, when a measurement of the primary cell (PCell) becomes worse than a first threshold and a measurement of the neighboring cell becomes better than a second threshold. This report may be used by the network to make decisions, such as whether a handover is needed to a cell and the like.

To illustrate by example, the MSE configuration information may specify that when the user equipment determines it is in a normal mobility condition (for example, MSE condition), the user equipment should report only in accordance with a certain event reporting criteria, such as Event A3. And, the MSE configuration information may specify a certain event reporting criteria, such as Event A5 event, when the user equipment is in another MSE state, such as a medium or high MSE condition. In this example, the user equipment may determine its mobility, such as MSE, and then activate a certain event reporting criteria, which is valid (e.g., active) given the determined MSE condition.

In some example embodiments, the network may provide (which may be signaled to the user equipment) the MSE configuration information for the one or more MSE conditions, although the MSE conditions may be provided statically, such as via a specification or default configuration. These states may include, for example a normal condition, a medium condition, a high condition, a normal or a medium condition ("normal-or-medium), a medium or a high condition ("medium-or-high), a normal or a high condition ("normal-or-high"), and/or the like. And, this MSE configuration information may be provided by the network to the user equipment along with other configuration information or by including an indication of the one or more mobility estimation states (for example, as a range of MSEs, hereinafter "MSE validity range") in a measurement object used by the user equipment. Table 1 depicts an example of a portion of a measurement object used by the user equipment to specify MSE conditions and the validity of the MSE conditions for different events, such as Event A1-Event A6.

TABLE 1

| mseValidityRange | ENUMERATED {normal, medium, high, normalOrMedium, mediumOrHigh, normalOrHigh, any, spare} |
|---|---|

Referring to Table 1, the MSE validity ranges which have been defined include normal, medium, high, normalOrMedium, mediumOrHigh, normalOrHigh, any, spare, although other types and quantities of MSE conditions may be used as well. For example, normal may represent pedestrian speed, medium may represent city driving speed, high may represent high-speed train or highway speed, and normalOrMedium may represent that the user equipment is in normal MSE or in medium MSE, mediumOrHigh may represent that the user equipment is in medium MSE or in high MSE, and normalOrHigh represent may represent that the user equipment is in normal MSE or in high MSE, and any may represent any mobility state value, although other values may be used to distinguish other mobility states of the user equipment. For example, the network may configure the thresholds in terms of number of handovers within a time window for medium and high mobility state. And, these thresholds may be configured by the network.

In some example embodiments, when a user equipment does not have an MSE estimate or does not have an accurate MSE estimate, it may consider all of the given reporting configurations or measurement objects valid.

In some example embodiments, the depicted element at Table 1 may be included in a measurement object (for example, a ReportConfigEUTRA information element described in TS 36.311, V11.2.0 2012-12) augmented to include the mseValidityRange as depicted at Table 2 (below at bold and italics). The measurement object represents an object used to configure user equipment reporting to the network.

TABLE 2

```
-- ASN1START
ReportConfigEUTRA ::=              SEQUENCE {
    triggerType                        CHOICE {
        event                              SEQUENCE {
            eventId                            CHOICE {
                eventA1                            SEQUENCE {
                    a1-Threshold                       ThresholdEUTRA
                },
                eventA2                            SEQUENCE {
                    a2-Threshold                       ThresholdEUTRA
                },
```

TABLE 2-continued

```
        eventA3                              SEQUENCE {
            a3-Offset                            INTEGER (-30..30),
            reportOnLeave                        BOOLEAN
        },
        eventA4                              SEQUENCE {
            a4-Threshold                         ThresholdEUTRA
        },
        eventA5                              SEQUENCE {
            a5-Threshold1                        ThresholdEUTRA,
            a5-Threshold2                        ThresholdEUTRA
        },
        ...,
        eventA6-r10                          SEQUENCE {
            a6-Offset-r10                        INTEGER (-30..30),
            a6-ReportOnLeave-r10                 BOOLEAN
        }
    },
    hysteresis                           Hysteresis,
    timeToTrigger                        TimeToTrigger,
    mseValidityRange                     ENUMERATED { normal, medium, high,
normalOrMedium,mediumOrHigh, normalOrHigh, any, spare }
    },
    periodical                           SEQUENCE {
        purpose                              ENUMERATED {
                                                 reportStrongestCells, reportCGI}
        }
    },
    triggerQuantity                      ENUMERATED {rsrp, rsrq},
    reportQuantity                       ENUMERATED {sameAsTriggerQuantity, both},
    maxReportCells                       INTEGER (1..maxCellReport),
    reportInterval                       ReportInterval,
    reportAmount                         ENUMERATED {r1, r2, r4, r8, r16, r32, r64, infinity},
    ...,
    [[  si-RequestForHO-r9                  ENUMERATED {setup}  OPTIONAL,  -- Cond reportCGI
        ue-RxTxTimeDiffPeriodical-r9        ENUMERATED {setup}  OPTIONAL   -- Need OR
    ]],
    [[  includeLocationInfo-r10             ENUMERATED {true}   OPTIONAL,  -- Need OR
        reportAddNeighMeas-r10              ENUMERATED {setup}  OPTIONAL   -- Need OR
    ]]
}
ThresholdEUTRA ::=                       CHOICE{
    threshold-RSRP                           RSRP-Range,
    threshold-RSRQ                           RSRQ-Range
}
-- ASN1STOP
```

In the example of Table 2, each of Events A1-A6 may be specified with respect to one or more MSE conditions. Accordingly, when the user equipment determines an MSE condition, such as whether it is in a normal condition, a medium condition, and the like, the user equipment can determine which Events A1-A6 should be considered valid and thus triggered and reported to the network.

In some example embodiments, the network may configure the user equipment to apply a certain measurement object, such as the measurement object depicted at Table 3 below, only when the user equipment has a certain MSE condition, such as a normal MSE condition and the like. Alternatively or additionally, the network may configure the user equipment with a reporting configuration for a small cell that is valid only when the user equipment is in a certain MSE condition, such as a normal MSE and the like. For example, a simple indication, such as for example a single bit, per reporting configuration (or a measurement object) indicating whether the corresponding reporting or measurements may be omitted when user equipment is at a high MSE (or other specified or configured condition). Alternatively or additionally, this indication may indicate that the corresponding reporting configuration (or measurement object) is for offloading reason (not coverage reason), and the user equipment may omit the associated measurements at high MSE or speed.

For example, when the user equipment is in a normal MSE condition, the user equipment may be configured to only trigger reporting events, such as A3 event, but when the user equipment is in a medium or high MSE condition, the user equipment may be configured to trigger only for A5 event.

Although some of the examples disclosed herein refer to specific reporting events, such as Event A3, Event A5, and the like, other reporting events including A1, A2, A4, B1, and the like may be used as well including those events described in 3GPP TS 36.331.

Table 3 depicts an example of a measurement object, such as the MeasuObjectEUTRA information element, configured to include the MSE validity range (at bold and italics).

```
-- ASN1START
MeasObjectEUTRA ::=                      SEQUENCE {
    carrierFreq                              ARFCN-ValueEUTRA,
    allowedMeasBandwidth                     AllowedMeasBandwidth,
    presenceAntennaPort1                     PresenceAntennaPort1,
    neighCellConfig                          NeighCellConfig,
```

```
    offsetFreq                          Q-OffsetRange                       DEFAULT dB0,
    -- MSE validity
      mseValidityRange              ENUMERATED { normal, medium, high,normalOrMedium,
mediumOrHigh, normalOrHigh, any, spare }
    -- Cell list
    cellsToRemoveList                   CellIndexList                      OPTIONAL,       -- Need ON
    cellsToAddModList                   CellsToAddModList                  OPTIONAL,       -- Need ON
    -- Black list
    blackCellsToRemoveList              CellIndexList                      OPTIONAL,       -- Need ON
    blackCellsToAddModList              BlackCellsToAddModList             OPTIONAL,       -- Need ON
    cellForWhichToReportCGI             PhysCellId                         OPTIONAL,       -- Need ON
    ...,
    [[measCycleSCell-r10               MeasCycleSCell-r10         OPTIONAL,       -- Need ON
        measSubframePatternConfigNeigh-r10    MeasSubframePatternConfigNeigh-r10   OPTIONAL
                        -- Need ON
    ]],
    [[widebandRSRQ-Meas-r11            ENUMERATED {enabled}    OPTIONAL     -- Cond WB-RSRQ
    ]]
}
CellsToAddModList ::=           SEQUENCE (SIZE (1..maxCellMeas)) OF CellsToAddMod
CellsToAddMod ::=       SEQUENCE {
    cellIndex                           INTEGER (1..maxCellMeas),
    physCellId                          PhysCellId ,
    cellIndividualOffset                Q-OffsetRange
}
BlackCellsToAddModList ::=      SEQUENCE (SIZE (1..maxCellMeas)) OF BlackCellsToAddMod
BlackCellsToAddMod ::=  SEQUENCE {
    cellIndex                           INTEGER (1..maxCellMeas),
    physCellIdRange                     PhysCellIdRange
}
MeasCycleSCell-r10 ::=          ENUMERATED {sf160, sf256, sf320, sf512,
                                            sf640, sf1024, sf1280, spare1}
MeasSubframePatternConfigNeigh-r10 ::=     CHOICE {
    release                             NULL,
    setup                               SEQUENCE {
        measSubframePatternNeigh-r10        MeasSubframePattern-r10,
        measSubframeCellList-r10            MeasSubframeCellList-r10   OPTIONAL  -- Cond
measSubframe
    }
}
MeasSubframeCellList-r10 ::= SEQUENCE (SIZE (1..maxCellMeas)) OF PhysCellIdRange
-- ASN1STOP
```

In some example embodiments, the network may independently also provide to the user equipment at least one of a time to trigger and a hysteresis for one or more of the specified one or more MSE states, such as normal, medium, high, normal-or-medium, medium-or-high, normal-or-high, and the like. For example, the user equipment may be configured with a different time-to-trigger for high and medium MSE (for example, 256 milliseconds (ms)) for Event A3 and a different time-to-trigger for normal MSE (for example, 512 ms) for Event A3 or another event. And, different hysteresis, threshold or event may be configured as well for different values of the MSE or range of MSEs.

In some example embodiments, the user equipment may be configured to trigger two events, such as Event A3 and Event A5, each of which has a specified condition for triggering a report to the network. Specifically, the user equipment may determine its MSE condition, and if the MSE represents normal, Event A3 event may be active, and when the user equipment determines that the conditions for Event A3 are satisfied, a report is triggered and sent to the network. The Event A3 represents a reporting criteria that evaluates whether a neighbor cell becomes offset better than the serving cell. But if the MSE represents something other than normal, such as high and the like, Event A5 event may be active (for example, valid), and when the user equipment determines that the conditions for Event A5 are satisfied, a report is triggered and sent to the network. The Event A5 represents reporting criteria that evaluates whether a measurement of the primary cell (PCell) becomes worse than a first threshold and a measurement of the neighboring cell becomes better than a second threshold. Accordingly, a report would be triggered in different event conditions depending on the MSE condition to allow a separate reporting treatment for a high mobility state user equipment and a normal mobility state user equipment.

In some example embodiments, different events, such as Event A3 and/or A5, may be used as triggering events for different MSEs.

In some example embodiments, the user equipment may be configured to have one or more event reporting criteria associated with a stationary user equipment and other event reporting criteria associated with a mobile user equipment.

In some example embodiments, a threshold value may be established. This threshold value may specify a highest and/or lowest MSE for which the associated event reporting criteria is valid and thus evaluated by the user equipment.

In some example embodiments, the MSE condition of the user equipment may also be used with respect to other types of reporting, such as periodic reporting sent to the network. Specifically, the user equipment may be configured to only send certain periodic reports, when the user equipment is in a configured MSE condition. For example, a periodic report, such as reporting of strongest cells on a carrier (or measurement object), may only be sent by the user equipment, when the user equipment is in a normal MSE condition as specified by the MSE configuration information. For example, the user equipment may trigger an event when one or more cells meet a specified entry condition. But in this case, based on the MSE state, there may be two reporting configurations for an Event A3 with two different entry conditions: one for normal or medium UE mobility state and one for the high UE mobility state. Here, the report would be triggered in different conditions depending on the MSE state allowing separation (for example, the high mobility state user equipment from the normal or medium mobility state). Similarly, different events (for example, Event A3 and/or A5) may be used for triggering events the different MSEs.

Moreover, in some example embodiments, just two levels of MSE may be differentiated (for example, normal and high, where high is a combination of the current medium and high MSEs). In this case, fewer possible values need to be reserved for the MSE range.

In some example embodiments, the reporting configuration may have limited validity to a certain MSE or range of MSEs. This may allow the user equipment to be configured with multiple reporting configurations for the same event having different triggering conditions. In some other example embodiments, also periodical reporting may have MSE validity range.

In some example embodiments, the user equipment may be configured to apply a certain measurement object (for example, a small cell carrier) only when UE is in, for example, a certain mobility state, such as a normal MSE, or similarly configure a reporting configuration for a small cell carrier that is valid only when the user equipment is in a certain mobility state, such as in a normal MSE). In some example embodiments, the network may then use this to configure the user equipment with, for example, different events for normal MSE, medium, high MSE, and/or the like for certain purposes.

When a change in the MSE condition of the user equipment (for example, from high to normal) occurs, an event reporting configuration may transition from valid to invalid (for example, due to changing MSE and the user equipment may stop reporting or even measuring). For example, in a high MSE condition, the user equipment may evaluate Event A3 and make measurements to evaluate that event, but after the user equipment transitions to a normal MSE condition, the Event A3 may no longer be valid, in which case the user equipment may stop evaluating invalid Event A3 and/or stop making measurements in order to evaluate now valid Event A5, which transitions from invalid to valid. The user equipment may, in some example embodiments, be configured to monitor all events but only send reports for the valid event, which in this example is the now valid Event A5. However, the user equipment may, in some example embodiments, be configured to only monitor the valid event, which in this example is the now valid Event A5.

In some example embodiments, if the reporting configuration becomes valid, there may be two options. A first option is that the user equipment may be constantly monitoring events and the sending of report may not be done until the MSE is in a given validity range (and the event timer may be running when the MSE changes). A second option is that the user equipment may be required to start measuring/monitoring only after the MSE changes (and, for example, a timeToTrigger is started only then if the triggering conditions are fulfilled). The first option may have the advantage that there is in some instances less delay in sending the report. However, in some cases, the second option may be more attractive because the user equipment may avoid measuring certain frequencies when the MSE range is not valid and thus save power.

In some example embodiments, the Event A4 (for example, neighbor becomes better than absolute threshold) may be configured. Event A4 may be used to find a potential small cell for offloading to another frequency when the MSE condition is normal (e.g., finding offloading small cells on another frequency with validity for normal MSE only). In this example, the user equipment may avoid the Event A4 criteria measurements altogether when the user equipment is in another event state, such as MSE medium or MSE high. Moreover, the user equipment may, in some example embodiments, be configured to make certain MSE event criteria measurements before it is actually needed, so that when the user equipment transitions to a given event, such as Event A4 and the like, the measurements are available to allow evaluation of the event criteria (for example, may start only when MSE drops back to normal).

In some example embodiments, the user equipment may stop measurements when outside the MSE validity range, but resumes measurements shortly before a mobility state change that is anticipated (which would require reporting to be activated) so that there is sufficient time to trigger a report immediately if triggering conditions are fulfilled. The mobility state change may be anticipated based on MSE monitoring and observing that a mobility event (for example, handover/reselection) is about to fall outside the configured monitoring window thus changing the MSE. The user equipment may anticipate this and start measurements early enough before the anticipated event so that there is enough time for the time-to-trigger condition to fulfill the reporting immediately upon MSE change, when the reporting becomes valid (so that there is no substantial/additional delay).

In some example embodiments, the measurement object (for example MeasObjectEUTRA information element, which is defined in Defined in 3GPP TS 36.331 V11.3.0 (2013-03)) may include (or be associated with) validity range of that object in terms of MSE. This measurement object including the validity range may be used by the user equipment as well.

In some example embodiments, the measurement object may be a carrier frequency of small cells, and then the measurement object may be configured to be valid only for a normal MSE condition. In this case, the reporting linked to that particular measurement object (for example, MeasObjectEUTRA) may be omitted, when the user equipment is not in normal MSE. Moreover, measurements linked to the measurement object may be omitted for the high speed user equipment (for example, MSE above normal). This may keep the user equipment out of small cells. This may be done by making inactive the measurement identifiers (e.g. MeasId) associated with the measurement object for the small cell. In some example embodiments, the measurement object may be limited to a set of cells (for example only small cells or a given list of cells). In some example embodiments, the measurement object may comprise or may be associated with a list of cells, and there may be an indication (for example, a 1 bit or Boolean value) in the reporting configuration indicating whether that configuration applies to the listed cells. In some example embodiments, there may be more than one list of cells associated with a measurement object and it could be separately indicated to which cells the reporting configuration applies. In some example embodiments, user equipment may be signaled a separate reporting object or list of cells for which a reporting configuration applies to. In this case, the reporting configuration may be associated with that list of cells. In some example embodiments, the list of cells for which the reporting configuration applies to may also be all the other cells on a carrier frequency corresponding to a measurement object except a given list of cells.

In some example embodiments, the reporting configuration or measurement object configuration signaled to user equipment includes information indicating whether the user equipment may stop both measurements and reporting or only stop reporting, when outside the configured MSE validity range.

Although some of the examples described refer to using MSE, the mobility of the user equipment may be determined in other ways as well (for example, user equipment speed, based on satellite positioning information, quantized or thresholded to few categories, and the like).

In some example embodiments, the reporting configuration or measurement object includes one or more MSEs for which it is not valid, and thus not activated and triggered. In some example embodiments, the reporting configuration or measurement object includes a threshold above (or below) which the reporting/measurements are not valid. In some example embodiments, when the user equipment omits measurements/reporting (for example, when a reporting configuration/measurement object is not valid), the user equipment may not be required to measure/report. For example, the user equipment may apply/follow relaxed requirements according to a specification. In some example embodiments, when the user equipment is not required to measure/report, it may still do so. In some example embodiments, the measurement requirements or other requirements for the user equipment may differ for the case when MSE is within a valid range and when it is outside it. To match the changes in measurement configuration for example, so that the requirements are less strict for when the user equipment is outside the MSE range or even that the user equipment is not required to report at all when outside the MSE range.

In some example embodiments, the user equipment may not be allowed to report outside the validity range of the corresponding reporting configuration or measurement object. In some example embodiments, the user equipment may omit one or more measurements when the reporting is not valid (or is inhibited) due to MSE condition not being met (for example, the user equipment's MSE is outside (i.e., not within) a given range or list of MSE values).

In some example embodiments, the user equipment may be configured to omit reporting when the MSE condition is not valid (for example, the MSE is outside a given range) and the user equipment subsequently omits measuring (one or more measurements of) a certain measurement object (for example, a carrier or a list of cells) when there are no active reporting configuration associated to that measurement object.

In some example embodiments, the user equipment may be configured with a reporting configuration or measurement object that is valid only with certain traffic condition (for example, average data rate over a time window exceeding a threshold, number of transmission over a time window exceeding a threshold, or amount of data in the buffer exceeding a threshold). This additional validity condition may also be used in addition or in combination to MSE validity condition.

Before providing additional examples, the following provides an example of a system framework in which some of the example embodiments described herein may be implemented.

FIG. 1 depicts a system 100 including wireless access points 110A-D, in accordance with some example embodiments. In the example of FIG. 1, wireless access point 110A may be configured as a base station, such as an eNB base station serving a macrocell 112A (also referred to as a cell and/or a coverage area). Wireless access points 110B-D may be configured to serve small cells 112B-D. For example, small cell 112B may be implemented as a picocell, a femtocell, and the like served by small cell base station 110B. Examples of small cell base stations include a picocell base station, a femtocell base station, a home base station, and a home E-UTRAN node B base station (HeNB) configured in accordance with standards, such as for example Third Generation Partnership Project (3GPP) Long Term Evolution (LTE). Although LTE is referred to herein, it is merely an example as other standards and technologies may be used as well. Moreover, small cell base stations may operate on a different carrier frequency than base station 110A serving the larger macrocell 112A, and, as such, when user equipment 114 is coupled to base station 110A serving macrocell 112A, user equipment 114 may need to search different frequencies (than the base station 110A) in order to find the small cell base stations 110B-C.

Moreover, base station 110A may, in some exemplary embodiments, be implemented as an evolved Node B (eNB) type base station, as noted above. When this is the case, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

Small cell base stations 110B-D may, in some exemplary embodiments, be implemented as a picocell base station, a femtocell base station, a home base station, and/or a home E-UTRAN node B base station (HeNB), as noted above. Although some of the examples herein refer to the small cell base stations as a femtocell base station, such as a HeNB, the small cell base stations may be implemented using other technologies and/or standards as well.

Although FIG. 1 depicts an example of a configuration for the base station 110A and small cell base stations 110B-D, base station 110A and small cell base stations 110B-D may be configured in other ways. For example, base station 110A and small cell base stations 110B-D may have wired and/or wireless backhaul links to other network nodes, such as a mobility management entity, other base stations, a radio network controller, a core network, a serving gateway, and the like.

In some exemplary embodiments, the system 100 may include wireless access links. The access links may include downlinks for transmitting to user equipment and an uplink for transmitting from user equipment to a base station. The downlink and uplink may each comprise a modulated radio frequency carrying information, such as user data, radio resource control (RRC) messages, location information, and the like.

In some exemplary embodiments, the user equipment 114 may be implemented as a mobile device and/or a stationary device. The user equipment 114 are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and/or a user interface. User equipment 114 may, in some example embodiments, be configured to operate in a heterogeneous network (also referred to as a HetNet) including small cells, such as small cell 112B, and macrocells, such as cell 112A. In some example implementations configured as a heterogeneous network, user equipment 114 may access base station 110A, such as an evolved node B base station, serving macrocell 112A, and user equipment 114 may also access small cell base station 110B serving small cell 112B. In the example of the HetNet with macrocell and small cells are configured with different frequencies, the user equipment 114 connected to base station 110A serving the large macrocell 112A may perform inter-frequency measurements to find available offloading opportunities offered by the small cells, such as small cell 112B.

Although FIG. 1 depicts four wireless access points 110A-D, four cells, such as macrocell 112A and small cells 112B-D, and user equipment 114, the system 100 may include other quantities and types of wireless access points, cells, and user equipment as well.

In the example of FIG. 1, macrocell 112A may operate on a first frequency, f1, and small cells 112B-D may operate on a second frequency, f2. Given that the network has configured user equipment 114 to trigger Event A4 under normal MSE (for example, wherein the Event A4 triggers if a neighbor becomes better than an absolute threshold), user equipment 114 measures and monitors for Event A4 triggering. However, in case of a medium or a high mobility MSE condition, user equipment 114 may omit measurements of frequency f2 and/or not report triggering of Event A4. In this example, the user equipment 114 may be inhibited from being handed over to a small cell since the network does not receive measurement reports of frequency f2 while in a medium or a high mobility MSE condition. However, the network may configure user equipment to use Event A5 when in a medium or a high mobility MSE condition, so Event A5 would trigger a report to the network when the macrocell becomes very weak and there is a need for a handover to a small cell.

Figure 2:
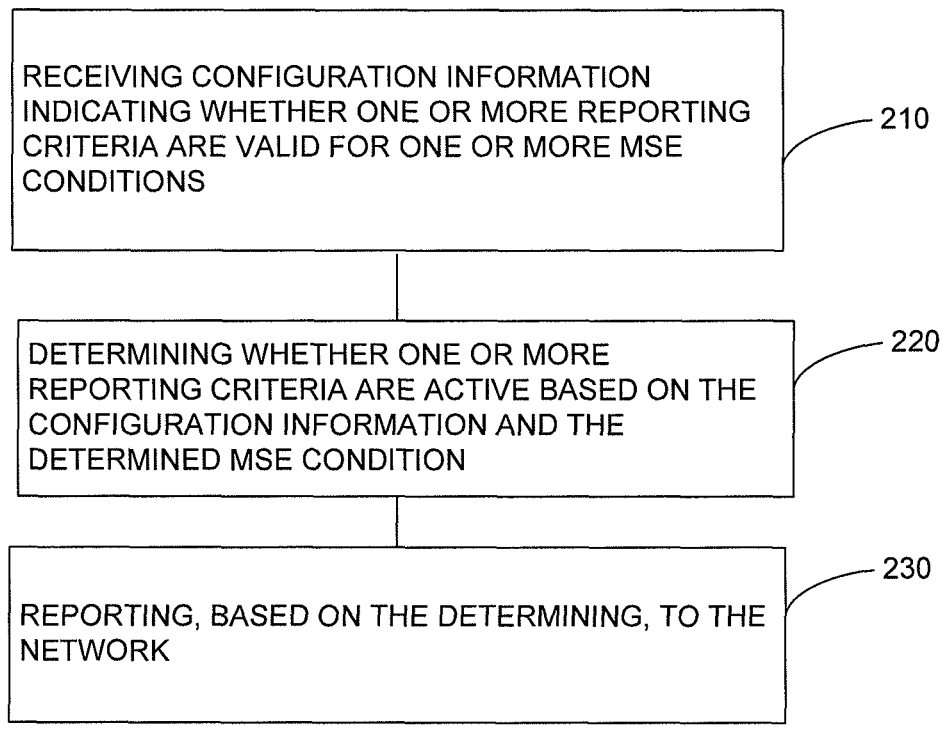
FIG. 2 depicts an example a process for configuring event reporting, in accordance with some exemplary embodiments.

FIG. 2 depicts an example a process 200 for configuring event reporting at a user equipment based on MSE, in accordance with some exemplary embodiments. The description of FIG. 2 also refers to FIG. 1.

At 210, MSE configuration information may be received at the user equipment, in accordance with some example embodiments. This MSE configuration information may indicate whether one or more reporting criteria, such as Events A1, A2, and the like, are to be used when the user equipment is in a certain MSE condition. The MSE configuration information may be signaled to the user equipment (for example, via a downlink and the like) or may be provided statically (for example, as a default configuration specified in a standard and the like). For example, the MSE configuration information may specify when the user equipment is in a first MSE condition, the user equipment may be configured to only trigger certain reporting events, such as Event A3 event, but when the user equipment is in a second MSE condition, the user equipment may be configured to trigger only for A5 event.

Although the previous example provided two MSE conditions, other quantities of MSE conditions may be specified as well. Indeed, the example of Table 2 defines normal, medium, high, and so forth. Further, although the previous example described certain event criteria, such as Event A3, Event A4, and Event A5, other reporting criteria and/or events may be specified and associated with MSE conditions, and thus provided as MSE configuration information. Indeed, the example of Table 2 defines normal, medium, high, and so forth, and each of these may be linked to an associated reporting event.

At 220, the user equipment may determine whether one or more reporting criteria are active, in accordance with some example embodiments. The user equipment 114 may determine its MSE condition, such as normal, medium, high, and/or the like. In addition, the user equipment 114 may determine which of the reporting criteria, such as Event A1-A6, B1, and so forth are active given the MSE condition and the MSE configuration information. Referring to the previous Event A3 and A5 example, the user equipment may determine, at a given time, the MSE condition as normal, and then determine, based on the MSE configuration and the determined MSE condition of the user equipment, that only Event A3 is valid. When this is the case, user equipment 114 may evaluate criteria, such as whether a neighbor cell becomes offset better than the serving cell. However, if the user equipment determines that its MSE condition is medium or high, the user equipment may only consider Event A5 as active. When this is the case, user equipment 114 may evaluate Event A5 criteria, such as a measurement of the primary cell (PCell) becomes worse than a first threshold and a measurement of the neighboring cell becomes better than a second threshold, in which case Event A5 would be triggered and thus reported to the network.

At 230, the user equipment may report based on the determined reporting criteria, in accordance with some example embodiments. Referring to the previous Events A3 and A5 examples, when Event A3 is active, based on the MSE condition normal, user equipment sends, when triggered, a corresponding Event A3 report to the network. But when Event A5 is active, based on the MSE condition medium or high, the user equipment sends, when triggered, a corresponding Event A5 report to the network. The user equipment 114 may choose, or be configured to, not perform some measurements associated with other events not considered valid at 220. As noted, although some of the examples described herein refer to specific events, other events and/or reporting criteria may be used as well. For example, the A4 Event may be configured to be valid only in a normal MSE condition to inhibit reporting to the network when the user equipment is in a medium or high mobility state and a small cell is a neighboring cell being measured for possible handover.

Figure 3:
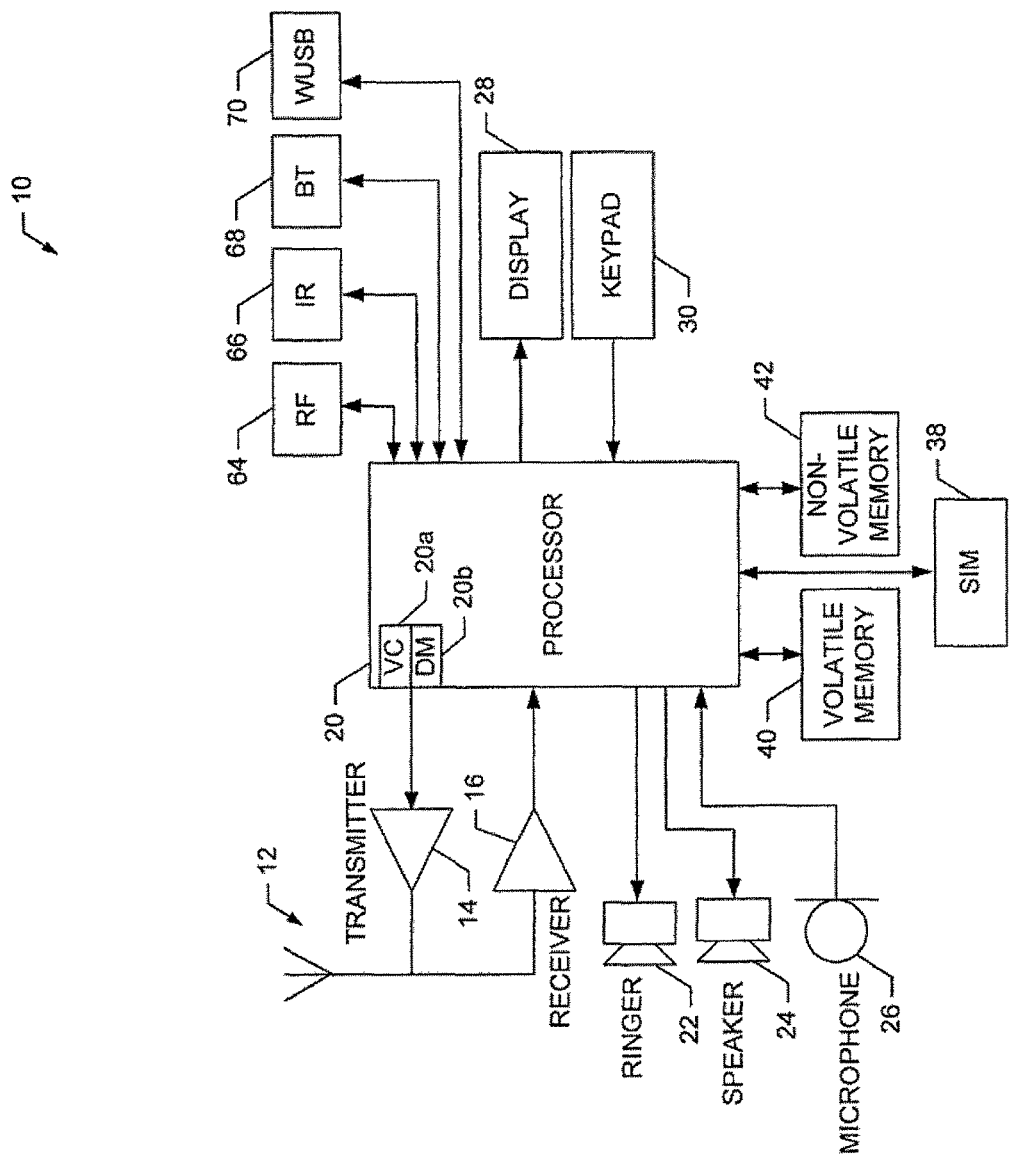
FIG. 3 depicts an example of a user equipment, in accordance with some exemplary embodiments.

FIG. 3 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at process 200 (for example, activate the cellular modem and/or the like). The memories may comprise an identifier, such as for example, an international mobile equipment identification (IMEI) code, capable of uniquely identifying apparatus 10. In the example embodiment, the processor 20 may be configured using computer code stored at memory 40 and/or 42 to enable generation of messages including the radio technology capabilities of the apparatus and configuration of a device-to-device link in accordance with a selected radio technology for a device-to device link from the apparatus to another apparatus.

Figure 4:
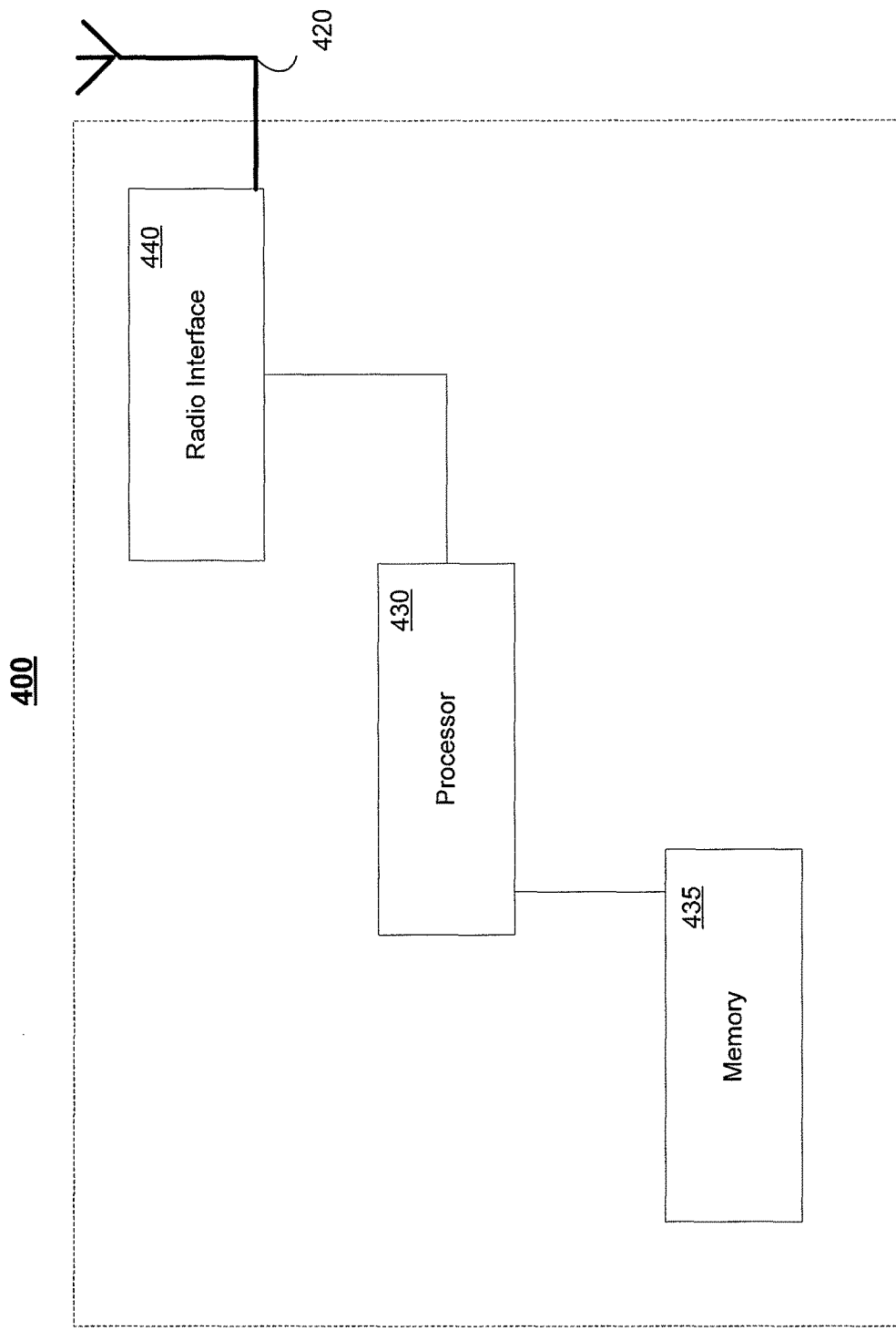
FIG. 4 depicts an example of a base station, in accordance with some exemplary embodiments.

FIG. 4 depicts an example implementation of a network node, such as base station 110. The base station may include one or more antennas 420 configured to transmit via a downlink and configured to receive uplinks via the antenna(s) 420. The base station may further include a plurality of radio interfaces 440 coupled to the antenna 420. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 440 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more processors, such as processor 430, for controlling the access point 400 and for accessing and executing program code stored in memory 435. In some example embodiments, memory 435 includes code, which when executed by at least one processor causes one or more of the operations described herein with respect to a base station. For example, the base station may provide MSE configuration information to the user equipment, and/or provide any other operations associated with the network or base station disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 3 and 4. A computer-readable medium may comprise a non-transitory computer-readable storage medium that may be any media that can contain or store the instructions for use by or in connection with an instruction execution system, apparatus, or device, such as for example, a computer. And, some of the embodiments disclosed herein include computer programs configured to cause methods as disclosed herein (see, for example, process 200 and/or the like).

Without in any way limiting the scope, interpretation, or application of the claims appearing below, a technical effect of one or more of the example embodiments disclosed herein is allowing user equipment to measure and/or report events based on a mobility condition, which may be determined in terms of MSE. Without in any way limiting the scope, interpretation, or application of the claims appearing below, another technical effect of one or more of the example embodiments disclosed herein is allowing the restriction of certain measurements and/or event reporting which may prevent a high speed user equipment from measuring and reporting to the network events, which may avoid unnecessary small cell handovers.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   receiving, at a user equipment, configuration information including a range of mobility state values, wherein the range of mobility state values are associated with one or more event reporting criteria;
   determining, at the user equipment, a mobile state estimate of the user equipment;
   applying a first event reporting criterion to at least inhibit reporting by the user equipment based at least on the determined mobile state estimate having a first mobility state value from the range of mobility state values; and
   applying a second event reporting criterion to at least enable reporting by the user equipment based at least on the determined mobile state estimate having a second mobility state value from the range of mobility state values.

2. The method of claim 1, wherein the range of mobility state values comprises at least one mobility state estimate value.

3. A method as in claim 1, wherein the range of mobility state values is mapped to the one or more event reporting criteria.

4. A method as in claim 1, wherein the configuration information is signaled by a network and/or received as a default configuration in accordance with a standard.

5. A method as in claim 1, wherein the inhibiting of reporting prevents the user equipment from performing one or more measurements.

6. A method as in claim 1, wherein the one or more event reporting criteria are associated with a reporting event, the reporting event comprising an Event A1, an Event A2, an Event A3, an Event A4, an Event A5, and/or an Event A6.

7. A method as in claim 1, wherein the range of mobility state values includes a plurality of states, each of which is mapped to the one or more event reporting criteria.

8. A method as in claim 1, wherein the range of mobility state values include at least one of a normal condition, a medium condition, or a high condition.

9. An apparatus comprising:
at least one processor; and
at least one memory including computer program code, the at least one memory and the computer program code configured to, with the at least one processor, cause the apparatus to at least:
receive configuration information including a range of mobility state values, wherein the range of mobility state values are associated with one or more event reporting criteria;
determine a mobile state estimate of the user equipment;
apply a first event reporting criterion to at least inhibit reporting by the apparatus based at least on the determined mobile state estimate having a first mobility state value from the range of mobility state values; and
apply a second event reporting criterion to at least to enable reporting by the apparatus based at least on the determined mobile state estimate having a second mobility state value from the range of mobility state values.

10. The apparatus of claim 9, wherein the range of mobility state values comprises at least one mobility state estimate value.

11. An apparatus as in claim 9, wherein the range of mobility state values is mapped to the one or more event reporting criteria.

12. An apparatus as in claim 9, wherein the configuration information is signaled by a network and/or received as a default configuration in accordance with a standard.

13. An apparatus as in claim 9, wherein the inhibiting of reporting prevents the user equipment from performing one or more measurements.

14. An apparatus as in claim 9, wherein the one or more event reporting criteria are associated with a reporting event, the reporting event comprising an Event A1, an Event A2, an Event A3, an Event A4, an Event A5, and/or an Event A6.

15. An apparatus as in claim 9, wherein the range of mobility state values includes a plurality of states, each of which is mapped to the one or more event reporting criteria.

16. An apparatus as in claim 9, wherein the range of mobility state values comprises at least one mobility state estimate value representative of a mobility of the user equipment.

17. An apparatus as in claim 9, wherein the range of mobility state values include at least one of a normal condition, a medium condition, or a high condition.

18. A non-transitory computer-readable storage medium including computer code, which when executed by at least one processor provides operations comprising:
receiving, at a user equipment, configuration information including a range of mobility state values, wherein the range of mobility state values are associated with one or more event reporting criteria;
determining, at the user equipment, a mobile state estimate of the user equipment;
applying a first event reporting criterion to at least inhibit reporting by the user equipment based at least on the determined mobile state estimate having a first mobility state value from the range of mobility state values; and
applying a second event reporting criterion to at least enable reporting by the user equipment based at least on the determined mobile state estimate having a second mobility state value from the range of mobility state values.

* * * * *